June 6, 1961
T. MILLER
2,987,699
HOMING-TORPEDO REVERBERATION-ATTENUATING
TRANSDUCER APPARATUS
Filed Nov. 17, 1953
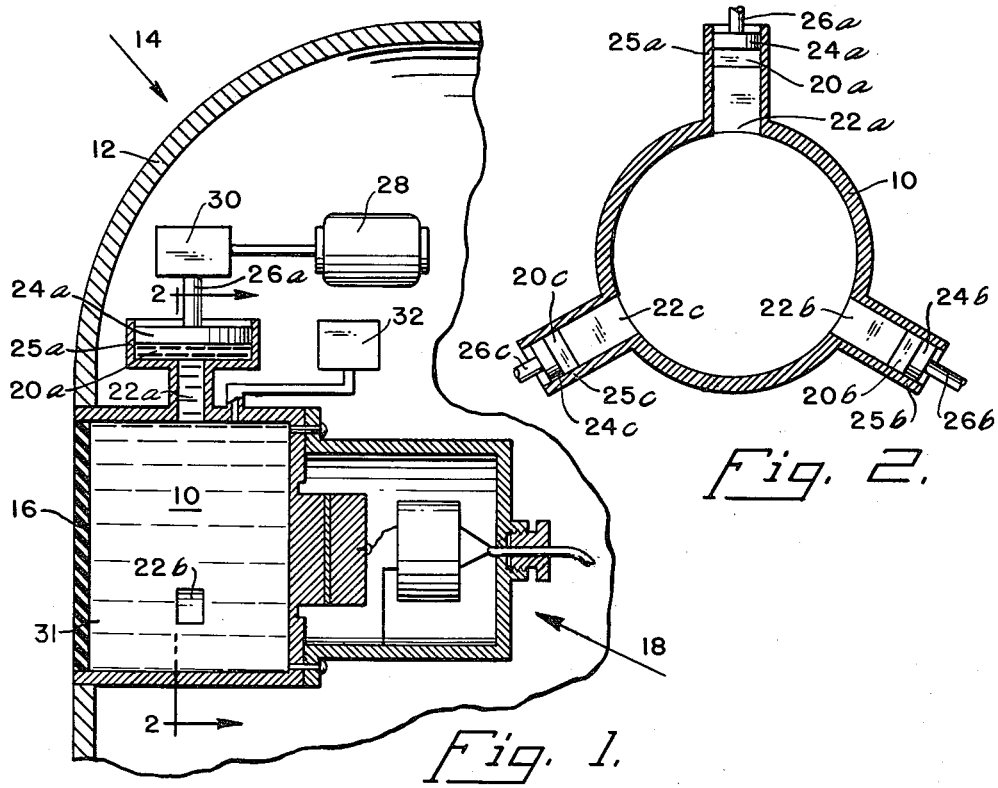
Fig. 1.
Fig. 2.
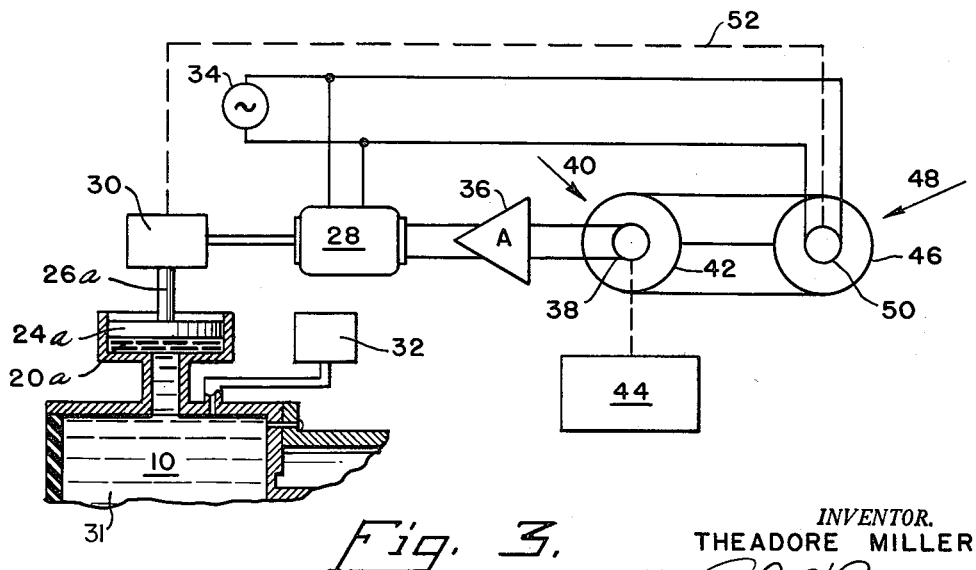
Fig. 3.
INVENTOR.
THEADORE MILLER
BY
ATTORNEYS

2,987,699
HOMING-TORPEDO REVERBERATION-ATTENUATING TRANSDUCER APPARATUS

Theadore Miller, Los Angeles, Calif., assignor, by mesne assignments, to the United States of America as represented by the Secretary of the Navy
Filed Nov. 17, 1953, Ser. No. 392,787
7 Claims. (Cl. 340—3)

This invention relates to underwater acoustic devices and in particular to a reverberation filter for an active acoustic guidance means for a torpedo.

In a torpedo-borne active acoustic guidance system of the type for which the present invention is intended, acoustic energy is transmitted at a substantially constant frequency in a beam directed ahead of the torpedo. If a target is present within the transmitted beam, a portion of the transmitted acoustic energy will be reflected from the target toward the torpedo, and the target echoes must be detected and utilized by an acoustic receiver which forms a component of the torpedo guidance system.

The frequency of the reflected energy, as received by the torpedo will differ from the transmitted frequency by an amount which is due to the Doppler effect resulting from the velocity component of the target along the torpedo heading and relative to the torpedo.

A portion of the transmitted acoustic energy is also reflected by small discontinuities in the water, such as bubbles, etc. The energy so reflected is called reverberation, and has a frequency which differs from the transmitted frequency by an amount due to the Doppler shift resulting from the speed of the torpedo alone since the sources of the reverberation are substantially motionless in the water.

Reverberation generally has a greater amplitude than that of the energy reflected from a target, and its difference in frequency from the energy reflected from a target may often be relatively small. Reverberation must by some means, after reception, be substantially eliminated or suppressed as to intensity with respect to the reflected energy from a target, if the active acoustic guidance means is to operate in a satisfactory manner. Reverberation can of course be suppressed in the acoustic receiver by means of an ordinary electrical filter, or by means such as quartz electromechanical filters. However, electrical filters have a relatively low "Q" which would also to some extent cause attenuation of the reflected signal of the target, and crystal filters are bulky and expensive. Further, crystal filters can be designed only for use at a fixed reverberation frequency corresponding to a specific torpedo speed. Thus, since the speed of a torpedo is not always constant, the effectiveness of such filters in eliminating reverberation decreases rapidly as the speed of the torpedo changes.

It is therefore an object of this invention to provide an acoustic filter, for the receiver of an acoustic guidance system, which substantially eliminates reverberation.

It is a further object of this invention to provide an acoustic filter, for the receiver of an acoustic guidance system, which will substantially eliminate reverberation irrespective of the speed of the device in which the acoustic guidance system is mounted.

Other objects and many of the attendant advantages of this invention will be readily appreciated as the same become better understood by reference to the following detailed description when considered in connection with the accompanying drawings wherein:

FIG. 1 is a fragmentary central section through the nose of a torpedo;

FIG. 2 is a section taken on line 2—2 of FIG. 1; and

FIG. 3 is a schematic diagram of means for varying the resonant frequency of an acoustic filter in response to variations in speed.

Referring to FIGS. 1 and 2, cylindrical acoustic chamber 10 is mounted in the nose portion 12 of a torpedo 14. The forward boundary of acoustic chamber 10 is formed by diaphragm 16, which may be made of rubber. Transducer 18 of an acoustic receiver, a component of an active acoustic guidance means which is not illustrated, forms the rear boundary of chamber 10. A plurality of acoustic filters, or cavities, 20a, 20b, 20c are in communication with the interior of chamber 10 through connecting conduits 22a, 22b, 22c. Movable pistons 24a, 24b, 24c form one boundary of each of the cavities 20a, 20b, 20c. The pistons 24a, 24b, 24c, are adapted to be moved within cylinders 25a, 25b, 25c, respectively, by means of piston rods 26a, 26b, 26c to change the volume of cavities 20a, 20b, 20c which in turn varies the resonant frequency, $f_r$ of the cavities as will be explained subsequently. In FIG. 3, piston 24a is adapted to be moved to increase or decrease the volume of cavity 20a by means of servo motor 28 operatively connected to gear box 30, the latter including any suitable mechanism to effect reciprocation of piston rod 26a. Similar means can be used to vary the volumes of cavities 20b and 20c in unison with that of cavity 20a. The acoustic chamber 10, cavities 20a, 20b, 20c and connecting conduits 22a, 22b, 22c are adapted to be filled with a suitable liquid medium 31, such as distilled water, in a preferred example. Reservoir 32 which is shown as being in communication with chamber 10 through a narrow bore tube permits the volume of the acoustic cavities to be changed without formation of voids or changing the pressure of the medium in the cavity.

The resonant frequency $f_r$ of acoustic cavities 20a, 20b, 20c is defined by equation $$(1) \qquad f_r = \frac{1}{2\pi\sqrt{MC}}$$

where C, the acoustic capacitance, is defined by equation $$(2) \qquad C = \frac{V}{pv^2}$$

and M, the acoustic inductance is defined by equation $$(3) \qquad M = \frac{m}{s^2}$$

In the above equations $V$ = the volume of a resonant cavity in cm.³
$p$ = the density of fluid medium in gm./cm.³
$v$ = the velocity of sound in the fluid medium in cm./sec.
$m$ = the mass of the medium in gm. in the conduit leading to a cavity, and
$s$ = the cross sectional area in cm.² of the conduit.

From the above equations it is seen that the resonant frequency of each acoustic cavity 20a, 20b, 20c can be changed by changing its volume.

While a single acoustic cavity can be used, the filtering action is enhanced if a plurality of identical acoustic cavities are employed, located symmetrically around the periphery of acoustic chamber 10 as illustrated in FIGS. 1 and 2.

In FIG. 3 there is illustrated one form of means for varying the resonant frequency $f_r$ of cavity 20a with changes in the speed of torpedo 14 so that $f_r$ will always equal the frequency of the reverberation. Similar means can be used to vary the resonant frequencies of cavities 20b, 20c in unison with that of cavity 20a. Piston 24a is moved to change the volume of acoustic cavity 20a by piston rod 26a, gear box 30 and two phase A.C. servo motor 28. One of the windings of servo motor 28 is energized by a source of alternating current 34. The other winding of servo motor 28 is energized by the output of servo amplifier 36, which amplifier is adapted to amplify error voltages induced in the rotor 38 of synchro control transformer 40. The stator 42 of synchro control transformer 40 is adapted to remain in a fixed position, while rotor 38 is positioned by torpedo speed measuring means 44 which, here illustrated schematically, may use a Pitot tube or any other conventional means to measure the speed of torpedo 14. The stator 42 of synchro control transformer 40 is electrically connected to the stator 46 of synchro generator 48. Rotor 50 of synchro generator 48 is energized by A.C. source 34 and is positioned relative to stator 46 by shaft 52, which is schematically illustrated as a dashed line, and which shaft is connected to turn as piston 24a is moved. Speed measuring means 44 positions rotor 38 so that for any change in the speed of torpedo 14 rotor 38 will be turned, the amount of turning being a function of the change in speed. The angular displacement of rotor 38 relative to stator 42 yields an error voltage in the windings of rotor 38 which is amplified by servo amplifier 36 and applied to servo motor 28 which, by means of gear box 30 and piston rod 26a, causes piston 24a to be displaced and thus to change the volume of acoustic cavity 20a. Movement of piston 24a by means of shaft 52 causes corresponding angular displacement of the rotor 50. The direction of displacement of rotor 50 is such as to tend to eliminate the error voltage. Thus, the volume of chamber 20a is changed so that the resonant frequency of cavity 20a will equal the frequency of the reverberation for the speed measured by the speed measuring means 44.

In operation as previously referred to, acoustic energy is transmitted from an acoustic transmitter of an active acoustic guidance system. Reflected acoustic energy, which includes reverberation, is transmitted through diaphragm 16 and the liquid medium with which acoustic chamber 10 is filled. Acoustic energy having the same frequency as the resonant frequency of acoustic cavities 20a, 20b, 20c, principally the water reverberation, is absorbed or filtered by these acoustic cavities, while acoustic signals at other frequencies impinge on transducer 18 with substantially no attenuation. In action, chamber 10 and a resonant cavity coupled thereto may be regarded as analogous to an electrical transmission line shunted by a series-resonant circuit which bypasses only the interfering signal to which the series resonent circuit is tuned, thus preventing transmission thereof. Transducer 18 converts the acoustic energy which strikes it into electrical signals. Since the reverberation has been substantially eliminated, the signal produced by transducer 18 will contain substantially no component due to reverberation. The suppression of the reverberation before it reaches transducer 18, as described, greatly simplifies the problem of detecting and amplifying the received target-reflected acoustic energy.

As already noted, the frequency of the reverberation varies as a function of the speed of torpedo 14, and the speed is generally not constant even during the run time of any given torpedo. The apparatus illustrated in FIG. 3 overcomes this problem in practical manner, being adapted to vary the resonant frequency of the acoustic cavities 20a, 20b, 20c so as to equal the frequency of the reverberation irrespective of variations in torpedo speed.

Obviously many modifications and variations of the present invention are possible in the light of the above teachings. It is, therefore, to be understood that within the scope of the appended claims the invention may be practiced otherwise than as specifically described.

What is claimed is:

1. In a torpedo having an active acoustic guidance system including a receiver transducer normally capable of receiving reflected sound energy including reverberation, an acoustic chamber for conducting sound energy from exterior of the torpedo to said transducer, and an acoustic absorption cavity in comunication with the acoustic chamber, said acoustic cavity having a resonant frequency substantially equal to the frequency of the reverberation and thus adapted to substantially prevent conduction of reverberation to said transducer.

2. In an acoustic torpedo having an active acoustic guidance system including a receiver transducer normally capable of receiving reflected acoustic energy including reverberation, an acoustic chamber for conducting sound energy from the exterior of the torpedo to said transducer, an acoustic absorption cavity in communication with said acoustic chamber, and means for varying the resonant frequency of the acoustic cavity to substantially match the frequency of the reverberation.

3. In a torpedo having an active acoustic guidance system including a receiver transducer normally capable of receiving reflected sound from a target and from the surrounding environment, an acoustic chamber for conducting sound energy from the exterior of the torpedo to said transducer, an acoustic cavity having a resonant frequency in communication with said acoustic chamber, and means for varying the resonant frequency of said acoustic cavity as a function of torpedo speed so that the resonant frequency of the cavity substantially equals the frequency of the reflected sound from the surrounding environment.

4. In combination with an underwater acoustic energy transducer adapted to be moved at variable speed and to normally receive reflected acoustic energy from a target and reverberation, an acoustic chamber adapted to connect said transducer with the water through which the acoustic energy is transmitted, an acoustic absorption cavity in communication with the acoustic chamber and having an adjustable resonant frequency, means for measuring the speed of said transducer, and means responsive to said speed measuring means for varying the resonant frequency of the acoustic cavity in accordance with measured speed so that transmission of reverberation to said acoustic chamber is substantially eliminated by said acoustic cavity.

5. In a vehicle adapted to move through water and having a transducer adapted to normally receive reflected acoustic energy from a moving target and reverberation, an acoustic chamber adapted to conduct the reflected acoustic energy to the transducer, a plurality of acoustic cavities in communication with the acoustic chamber, said chamber and cavities adapted to be filled with a suitable fluid medium, means for measuring the speed of the vehicle, and means responsive to said speed measuring means for varying the resonant frequencies of said acoustic cavities so that the resonant frequency of each of said cavities substantially equals the frequency of the reverberation, whereby, the reverberation is substantially suppressed before it reaches the transducer.

6. In combination with a transducer adapted to be moved at a variable speed and to normally receive reflected acoustic energy from a moving target and reverberation, an acoustic chamber adapted to conduct the reflected acoustic energy to the transducer, a plurality of acoustic absorption cavities symmetrically disposed around the acoustic chamber, each of said cavities being in communication with the acoustic chamber, means for measuring the speed of the transducer, and means for varying the resonant frequencies of said acoustic cavities in accordance with the measured speed so that the resonant frequency of each of said cavities substantially equals the frequency of the reverberation, whereby the reverberation is substantially eliminated before it reaches the transducer.

7. In a vehicle adapted to move through water and having a transducer adapted to convert reflected acoustic energy transmitted from an acoustic transmitter into electric signals, said reflected acoustic energy including reverberation, the improvements comprising; an acoustic chamber adapted to conduct said reflected acoustic energy to the transducer, an acoustic cavity, a conduit providing communication between said cavity and said chamber, a movable piston forming a boundary of said cavity, the movement of which varies the resonant frequency of the acoustic cavity, means for measuring the speed of the vehicle, and means responsive to said speed measuring means adapted to position said piston so that the resonant frequency of said acoustic cavity substantially equals the frequency of the reverberation, whereby, substantially no component of the electrical signal produced by the transducer is due to the reverberation.

References Cited in the file of this patent

UNITED STATES PATENTS

| | | |
|---|---|---|
| 852,760 | Blake | May 7, 1907 |
| 1,563,626 | Hecht | Dec. 1, 1925 |
| 1,625,245 | Dorsey | Apr. 19, 1927 |
| 1,715,831 | Hahnemann | June 4, 1929 |
| 1,892,431 | Hammond | Dec. 27, 1932 |